United States Patent
Goebel

(10) Patent No.: US 7,479,337 B2
(45) Date of Patent: Jan. 20, 2009

(54) FUEL CELL SHUTDOWN AND STARTUP USING A CATHODE RECYCLE LOOP

(75) Inventor: Steven G. Goebel, Victor, NY (US)

(73) Assignee: General Motors Corporation, Detroit, MI (US)

( * ) Notice: Subject to any disclaimer, the term of this patent is extended or adjusted under 35 U.S.C. 154(b) by 736 days.

(21) Appl. No.: 10/780,488

(22) Filed: Feb. 17, 2004

(65) Prior Publication Data

US 2005/0058860 A1    Mar. 17, 2005

Related U.S. Application Data

(63) Continuation-in-part of application No. 10/664,329, filed on Sep. 17, 2003, now Pat. No. 6,939,633.

(51) Int. Cl.
*H01M 8/04* (2006.01)
*H01M 8/10* (2006.01)

(52) U.S. Cl. ............... 429/17; 429/30; 429/34

(58) Field of Classification Search ............ 429/13, 429/17, 30
See application file for complete search history.

(56) References Cited

U.S. PATENT DOCUMENTS

| | | | | |
|---|---|---|---|---|
| 6,391,485 | B1 | 5/2002 | Perry | 429/13 |
| 6,399,231 | B1 * | 6/2002 | Donahue et al. | 429/13 |
| 6,514,635 | B2 | 2/2003 | Van Dine et al. | 429/17 |
| 6,519,510 | B1 | 2/2003 | Margiott et al. | 700/299 |
| 6,645,650 | B2 | 11/2003 | Meyer et al. | 429/13 |
| 6,984,464 | B2 * | 1/2006 | Margiott et al. | 429/12 |
| 2002/0076582 | A1 | 6/2002 | Reiser et al. | 429/13 |
| 2002/0076583 | A1 * | 6/2002 | Reiser et al. | 429/13 |
| 2003/0077487 | A1 | 4/2003 | Roberts et al. | 429/13 |
| 2004/0126628 | A1 * | 7/2004 | Balliet et al. | 429/13 |
| 2004/0146761 | A1 * | 7/2004 | Cargnelli et al. | 429/22 |

OTHER PUBLICATIONS

Chinese Patent Application No. 200480026901.2 filed Jun. 25, 2004 entitled Fuel Cell Shutdown and Startup Using a Cathode Recycle Loop—First Office Action issued Aug. 24, 2007 (12 pages).

* cited by examiner

*Primary Examiner*—Jonathan Crepeau
*Assistant Examiner*—Robert Hodge

(57) ABSTRACT

A method and device for operating a fuel cell system. A recirculation loop coupled to a fuel cell cathode ensures that fluids passing through the cathode are recycled, thereby enabling reaction between residual oxygen in the recycled fluid and fuel that has been introduced into the recirculation loop until a reduced voltage level across the fuel cell is achieved. Attainment of the reduced voltage level indicates that the recycled fluid is substaintially oxygen-free, yielding an inerting fluid. Thereafter, this compound, followed by air, or air directly can be used to purged the fuel cell's anode and relating flowpath during system shutdown. Similarly during system startup, hydrogen can then be introduced into the fuel cell's anode and then air into the cathode and related flowpath for normal operation. The placemet of a purge valve allows the anode to be purged with air without re-introducing air into the cathode.

12 Claims, 4 Drawing Sheets

FUEL CELL SHUTDOWN AND STARTUP USING A CATHODE RECYCLE LOOP

This application is a continuation in part of U.S. application Ser. No. 10/664,329, filed Sep. 17, 2003, now U.S. Pat. No. 6,939,633, issued Sep. 6, 2005, and is related to commonly assigned U.S. patent application Ser. No. 10/739,463, filed Dec. 18, 2003, the entire disclosure of which is herein incorporated fully by reference.

BACKGROUND OF THE INVENTION

The present invention relates generally to operating a fuel cell system, and more particularly to starting up and shutting down a fuel cell in such a way as to minimize oxidation of catalyst support material while maintaining system simplicity.

The use of catalysts to facilitate the electrochemical reaction between hydrogen and oxygen in fuel cells is well-known. Typically, the catalyst is in the form of a noble metal powder that is distributed on a support that is itself a powder of larger carbon or carbon-based particles. This powder-based approach allows for a significant increase in surface area upon which the aforementioned reaction can take place. While such a configuration provides for an efficient, compact reactor that by spreading the relatively expensive catalyst (such as platinum) over a large area results in significant improvements in power output with simultaneous reduction in raw material cost, its effectiveness can be limited by certain modes of operation. For example, even when the need for electric current produced in a fuel cell is reduced or ceases, the residual oxygen and hydrogen reactants continue to generate an open circuit voltage (typically around 0.9V or higher) that can lead to catalyst and catalyst support oxidation, thereby reducing fuel cell life. Of even greater concern is the presence of a hydrogen-air interface on one of the fuel cell electrodes (such as the anode) while air is present on the other electrode (such as the cathode), which can lead to potentials of between 1.4V and 1.8V being generated. These elevated potentials exacerbate the aforementioned corrosion of the catalyst and catalyst support material. This situation can occur during startup (when air is being purged by hydrogen) and during shutdown (when air is entrained into the anode as hydrogen is consumed by cross-over). The present inventors have observed that operational transients, particularly repeated system startup and shutdown, appear to shorten fuel cell life much faster than the comparable steady-state operation that takes place between such transients.

One way to alleviate the problem of residual fuel and oxidant is to inject an inert gas to purge both the anode flowpath and the cathode flowpath immediately upon cell shutdown. This could be accomplished by, for example, injecting onboard nitrogen into the anode and cathode flowpaths. However, this is disadvantageous, especially for many vehicle-based fuel cell systems, as the on-board use of a parasitic gaseous nitrogen supply would take up precious vehicle space otherwise used for passenger, comfort or safety features. Another approach is to introduce air into the anode flowpath so that the air can react with the residual hydrogen. By recirculating this mixture, the hydrogen can be ignited or catalytically reacted until virtually none remains. By this approach, no on-board nitrogen purge gas is required. However, this system is disadvantageous in that complex system componentry, including additional pumps coupled to intricate valve networks all tied together with precision control mechanisms, is required. Accordingly, there exists a need for a fuel cell system that can be started up and shut down without having to resort to approaches that require significant increases in weight, volume or complexity.

SUMMARY OF THE INVENTION

These needs are met by the present invention, wherein a fuel cell system and a method of operating the system in such a way as to avoid the detrimental effects of operational transients on system components is disclosed. In accordance with a first aspect of the present invention, a method of shutting down a fuel cell system is disclosed. The fuel cell system includes at least one fuel cell made up of at least an anode, cathode and membrane disposed between the anode and cathode, in addition to an anode flowpath configured to couple the anode to a fuel source, a cathode flowpath configured to couple the cathode to an oxygen source and a purge valve to allow the introduction of a purging fluid into the anode. The aforementioned flowpaths may include support equipment necessary for the flow of fluids in and around the fuel cell, including piping and related conduit. Valves (in addition to the aforementioned purge valve), pumps and related componentry, while also forming part of the flowpath, may also be individually discussed to more clearly identify their function within their respective flowpath. In the present system, a recirculation loop is formed in the cathode flowpath and in conjunction with connectivity between the cathode flowpath and anode flowpath provides a means for generating an inert gas without the high temperatures associated with undiluted, stoichiometric combustion. While one type of fuel cell that can benefit from the present invention is a proton exchange membrane (PEM) fuel cell, it will be appreciated by those skilled in the art that the use of other fuel cell configurations is also within the purview of the present invention. The present operation occurs by decoupling the anode from the fuel source so that the flow of fuel is cut off, recycling fluid disposed in the cathode flowpath through the recirculation loop, introducing fuel into the recirculation loop so that it can be reacted with the recycled fluid until the voltage of the fuel cell is reduced (such as due to the recycled fluid becoming substantially oxygen-depleted), decoupling the fuel source from the recirculation loop to discontinue the flow of fuel therethrough, and then introducing a purging fluid into the anode flowpath such that any fluid previously in the anode flowpath is substantially removed. The term "oxygen source" and its variants is to be understood broadly, encompassing any device, container or environment (including the ambient environment) configured to provide oxygen or a significant oxygen-bearing compound, mixture or the like. The reduction of the voltage (which can be measured by any conventional means) enables simpler system configuration and operation. For example, by establishing a reduction in voltage on one of the electrodes at the outset of the transient operating condition, continued or ongoing inerting can be reduced or eliminated, as the lower voltage level would be compatible with an air purge.

Optionally, a pressure source (for example, an air compressor) may be used to pressurize fluid contained within the recirculation loop. Preferably, the purge valve is disposed upstream of the cathode such that the purging fluid (which may be one or both of the substantially oxygen-depleted fluid and air) is diverted from the cathode flowpath upstream of the cathode and downstream of the oxygen source. In the case where the purging fluid includes both, the limited amount of substantially oxygen-depleted fluid being routed through the portion of the recirculation loop that coincides with the cathode flowpath is then followed by a larger quantity of air that can be fed from the oxygen source. The placement of the purge valve upstream of the cathode enables air from the oxygen source to purge the anode without having to use a large amount of the substantially oxygen-depleted fluid that is generated by the reaction between the fuel and oxygen. This can enable simpler system operation and reduced reliance on the inerting fluid produced by the fuel-oxygen reaction.

In one particular form, the recycling further comprises closing a cathode exit valve and opening a cathode flowpath recycle valve, both disposed within the recirculation loop. In addition, the step of introducing at least one of air or the substantially oxygen-depleted fluid into the anode through the purge valve comprises introducing the substantially oxygen-depleted fluid into the anode followed by introducing the air into the anode. To achieve this, the purge valve is disposed between the recirculation loop and the anode flowpath, and more particularly where the purge valve is fluidly coupled to the recirculation loop upstream of the cathode. The introducing of fuel into the recirculation loop can be achieved by adjusting a fuel inerting valve that fluidly couples the anode flowpath to the cathode flowpath. The step of introducing of the substantially oxygen-depleted fluid and the air into the anode is effected by closing the fuel inerting valve and opening the purge valve.

In another option, the amount of fuel being introduced into the recirculation loop can be regulated in order to maintain a predetermined ratio between the fuel and the oxygen present in the recycled fluid. The step of regulating the amount of fuel comprises sensing the amount of oxygen present in the recirculating loop and adjusting a fuel inerting valve that fluidly couples the anode flowpath to the recirculation loop. In one form, the fuel is hydrogen-rich, and can be methanol, hydrogen, methane, gasoline or similar hydrogen-bearing fuel. In one form, the oxygen source provides air. In addition, the reacting takes place in the presence of a catalyst. The catalyst can be disposed either on the cathode, or in a combustor that is fluidly coupled to the cathode flowpath. In situations involving a combustor, a cooler can be placed between the combustor and the at least one fuel cell. In one particular form, decoupling the anode from the fuel source is accomplished by closing a fuel supply valve.

According to another aspect of the present invention, a method of shutting down a fuel cell system is disclosed. As before, the fuel cell system includes at least one fuel cell made up of at least an anode, cathode and membrane disposed between the anode and cathode, in addition to an anode flowpath configured to couple the anode to a fuel source and a cathode flowpath configured to couple the cathode to an oxygen source. In addition, it includes a plurality of valves configured to establish fluid communication between the anode flowpath and the cathode flowpath, as well as a pressure source coupled to the air source and a device to facilitate a reaction between fuel and air. The steps involved in the present method include decoupling the anode from the fuel source, recycling fluid disposed in the cathode flowpath through the recirculation loop, introducing fuel into the recirculation loop, reacting the fuel with the recycled fluid until the voltage of the fuel cell is reduced, decoupling the fuel source from the recirculation loop to discontinue fuel flow and introducing air after the substantially oxygen-depleted fluid from at least a portion of the cathode flowpath is introduced into the anode flowpath such that any fluid previously resident therein is substantially purged therefrom.

According to yet another aspect of the present invention, a method of starting a fuel cell system is disclosed. Components within the system include at least one fuel cell, an anode flowpath, a cathode flowpath and a purge valve, all as previously described. Steps in this method include recycling fluid disposed in the cathode flowpath through the recirculation loop, introducing the fuel into the recirculation loop, reacting the fuel with the recycled fluid in the device until voltage across the fuel cell is reduced to a predetermined level, decoupling the fuel source from the recirculation loop to discontinue flow of the fuel thereto, filling the anode with fuel and introducing air into the cathode such that the at least one fuel cell can commence operation.

Optionally, the presence of the substantially oxygen-depleted fluid in the recirculation loop creates (at least temporarily) a negative voltage across the fuel cell, as excess hydrogen can appear on the cathode, while air appears on the anode. Filling the anode with fuel can be accomplished by opening a fuel supply valve disposed within the anode flowpath. The step of introducing the air into the cathode comprises opening a back-pressure valve disposed in the recirculation loop. Likewise, the step of introducing the air into the cathode further comprises adjusting a recycle valve disposed in the recirculation loop, while bleeding fluid from the oxygen source into the anode can be used to facilitate low temperature starting, or bleeding fuel from the fuel source into the cathode can be used to facilitate low temperature starting. In addition, the fuel cell system may include a plurality of valves configured to establish fluid communication between the anode flowpath and the cathode flowpath, as well as a pressure source coupled to the air source and a device to facilitate a reaction between fuel and air. Optional steps may include arranging the one or more valves disposed in the recirculation loop such that the fluid pressurized by the pressure source can be recycled through the loop, arranging the fuel inerting valve such that fuel can be introduced from the fuel source into the cathode flowpath, reacting the fuel with the recycled fluid until the recycled fluid becomes substantially oxygen-depleted, closing the inerting valve to decoupling the fuel source from the cathode flowpath, opening the fuel supply valve to fill the anode with fuel and introducing air into the cathode such that the at least one fuel cell can commence operation.

According to still another aspect of the invention, a device comprising at least one fuel cell is disclosed. The fuel cell includes an anode, a cathode and a membrane disposed between the anode and cathode. The device also includes an anode flowpath, a cathode flowpath and a plurality of valves configured to establish fluid communication between the anode flowpath and the cathode flowpath, all as previously described. The plurality of valves includes a fuel supply valve disposed between the fuel source and the anode, at least one valve disposed in the recirculation loop to selectively allow recycling of fluid in the loop, a fuel inerting valve and a purge valve. As described previously, the placement of the purge valve upstream of the cathode enables air from the oxygen source to purge the anode without having to use a large amount of the substantially oxygen-depleted fluid that is generated in the reactor between the fuel and oxygen. The device also includes a reactor configured to promote the reaction between fuel and oxygen. The device may further comprise a power conversion mechanism configured to take electricity generated by the fuel cell system and convert it to motive power, and may furthermore include a vehicle configured to house the fuel cell system and the power conversion mechanism. The vehicle (an example of which can be a car, truck, motorcycle, aircraft or watercraft) is movably responsive to the motive power generated in the power conversion mechanism.

According to another aspect of the invention, a method of transiently operating a fuel cell system is disclosed. In the present context, transient operating modes include a first mode where the system is being started up, and a second mode where the system is being shut down. The method includes configuring the system in one of the manners previously described, selecting from one of the two aforementioned transient operating modes, recycling fluid disposed in the cathode flowpath through the recirculation loop so that fuel is reacted with the recycled fluid until the fuel cell voltage is reduced to a predetermined level, discontinuing the reacting and introducing a fluid into at least one of the anode or the cathode such that any fluid previously resident in the respective electrode is substantially purged therefrom.

Additional optional steps may include providing a purge valve in the anode purge flowpath to effect the selective coupling of the recirculation loop to the anode. In addition to the purge valve, the system preferably includes a plurality of valves as previously described. In another option, the step of introducing a fluid into at least one of the anode or the cathode comprises sequentially introducing the substantially oxygen-depleted fluid followed by air. Similarly, the step of discontinuing the reacting can be achieved by closing the fuel inerting valve. For the startup steps, the selecting comprises selecting the first mode of operation. In addition, the anode can be filled with fuel after the reacting has been discontinued, while air can be flowed through the cathode once the anode has been filled with fuel. This last step can be achieved by disabling the recirculation loop (by, for example, appropriate manipulation of one or both of the previously-described cathode exit valve or cathode flowpath recycle valve). For the shutdown steps, the anode can be decoupled from the fuel source prior to recycling the fluid disposed in the cathode flowpath through the recirculation loop. In addition, the fluid flow through the cathode flowpath can be stopped once the anode is substantially purged. As previously discussed, the fluid used to purge the anode or cathode can be air, the inerting fluid generated by the reaction in the recirculation loop, or both. When the fluid being used to purge is air, it can be introduced into the anode flowpath from the cathode flowpath.

BRIEF DESCRIPTION OF THE DRAWINGS

The following detailed description of the present invention can be best understood when read in conjunction with the following drawings, where like structure is indicated with like reference numerals and in which.

DESCRIPTION OF THE PREFERRED EMBODIMENT

Figure 1A:
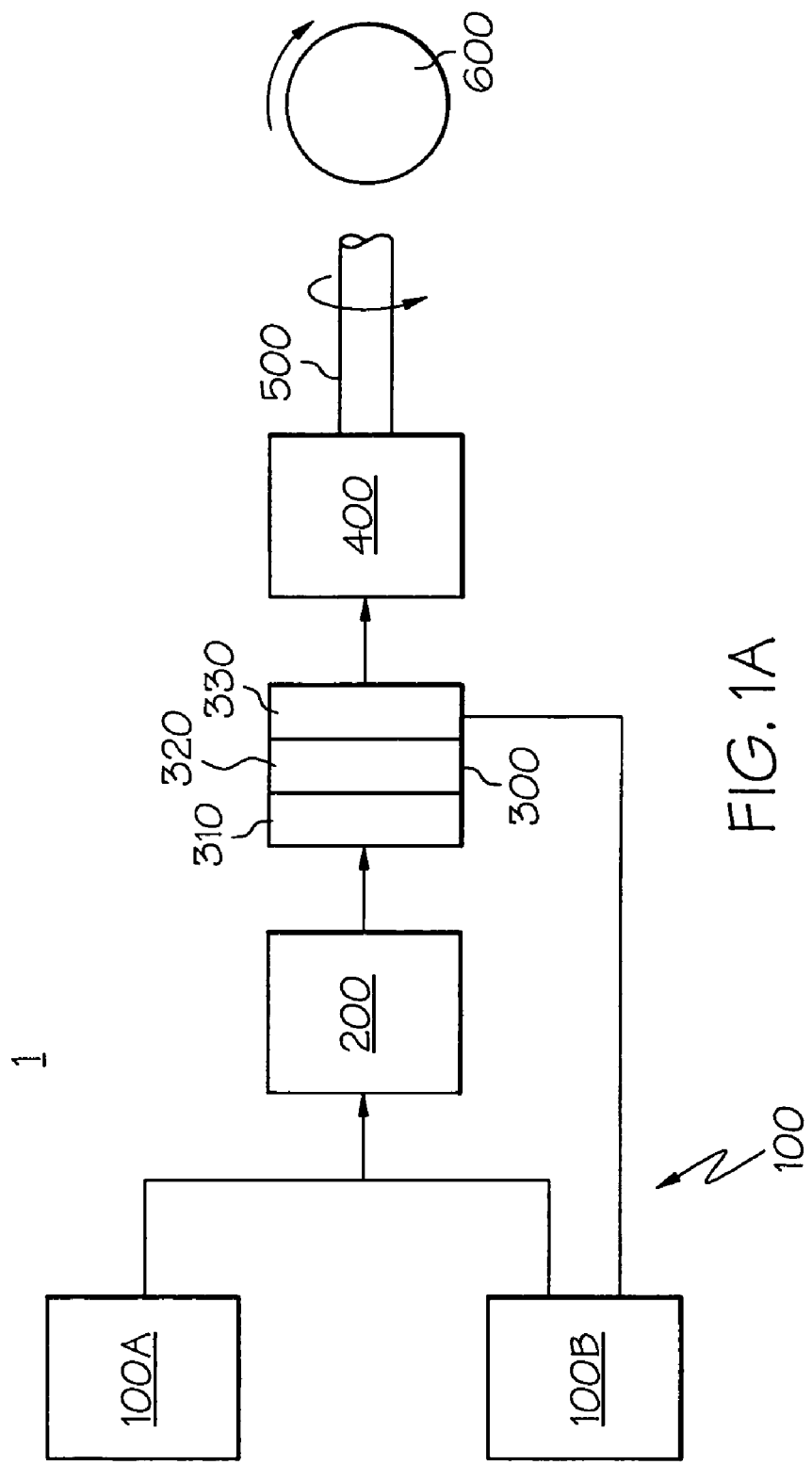
FIG. 1A shows a block diagram of a fuel cell system configured for a vehicular application.

Referring initially to FIG. 1A, a block diagram highlights the major components of a mobile fuel cell system 1 according to the present invention. The system includes a fuel delivery system 100 (made up of fuel source 100A and oxygen source 100B), fuel processing system 200, fuel cell 300, one or more energy storage devices 400, a drivetrain 500 and one or more motive devices 600, shown notionally as a wheel. While the present system 1 is shown for mobile (such as vehicular) applications, it will be appreciated by those skilled in the art that the use of the fuel cell 300 and its ancillary equipment is equally applicable to stationary applications. It will also be appreciated by those skilled in the art that other fuel delivery and fuel processing systems are available. For example, there could be, in addition to a fuel source 100A and oxygen source 100B, a water source (not shown). Likewise, in some variants where substantially purified fuel is already available, the fuel processing system 200 may not be required. The energy storage devices 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600. The fuel processing system 200 may be incorporated to convert a raw fuel, such as methanol into hydrogen or hydrogen-rich fuel for use in fuel cell 300; otherwise, in configurations where the fuel source 100A is already supplying substantially pure hydrogen, the fuel processing system 200 may not be required. Fuel cell 300 includes an anode 310, cathode 330, and an electrolyte layer 320 disposed between anode 310 and cathode 330. Although only a single fuel cell 300 is shown, it will be appreciated by those skilled in the art that fuel cell system 1 (especially those for vehicular and related applications) may be made from a stack of such cells serially connected.

Figure 1B:
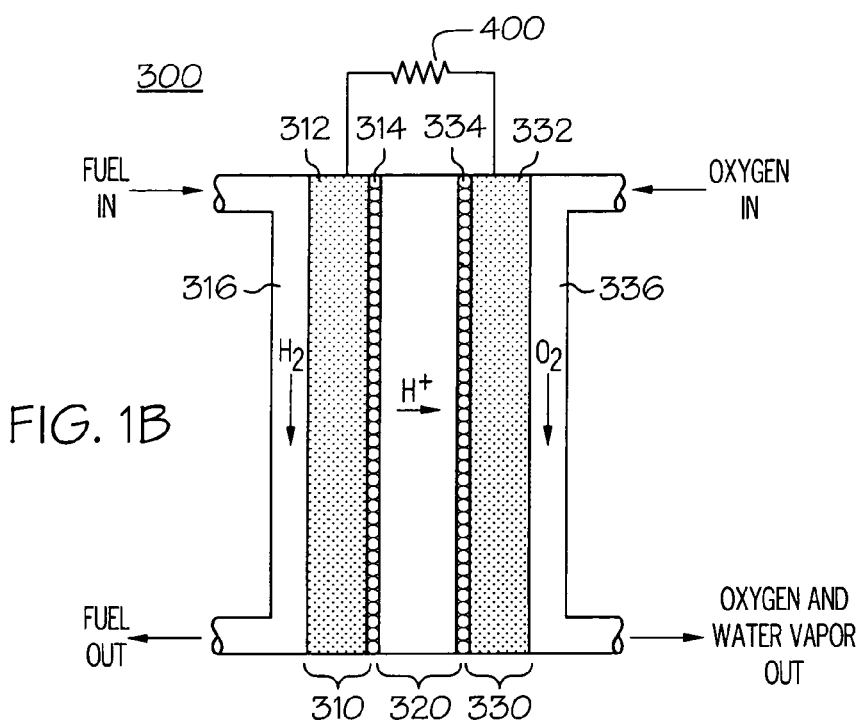
FIG. 1B shows a representative fuel cell from the system of FIG. 1A.
Figure 1C:
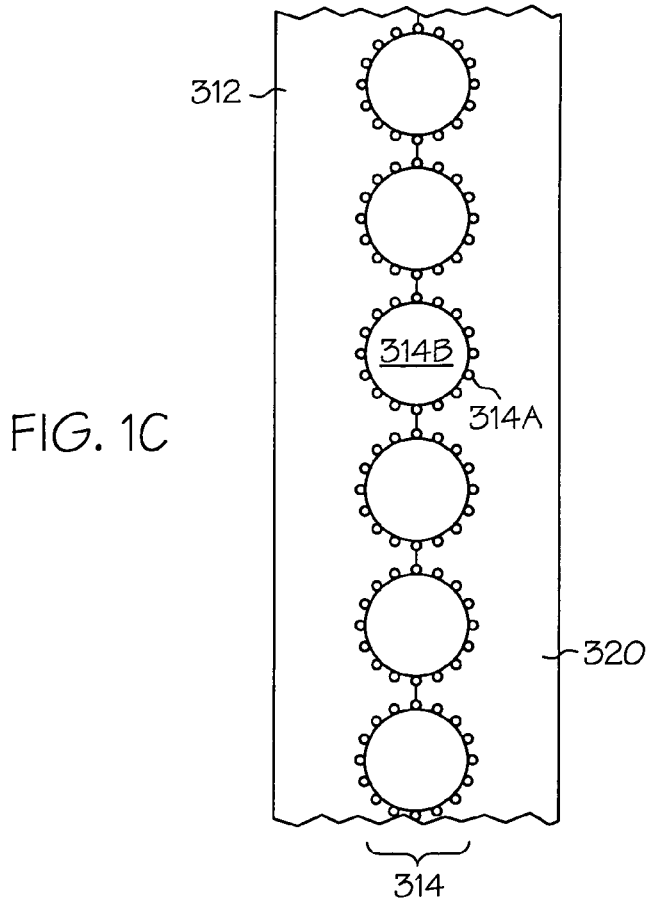
FIG. 1C shows an enlargement of the region between the anode and membrane of the fuel cell of FIG. 1B, highlighting the placement of a catalyst on a support, where the catalyst is used to facilitate the ionization of the fuel.

Referring next to FIGS. 1B and 1C, the anode 310 includes an electrode substrate 312 and catalyst layer 314 connected to a flow channel 316. The cathode 330 includes an electrode substrate 332 and catalyst layer 334 connected to a flow channel 336. Flow channels 316, 336 form the part of an anode flowpath and cathode flowpath (both described below) that contact their respective anode and cathode. Preferably, the electrode substrates 312, 332 are porous to allow diffusion of fuel and oxygen, as well as the flow of water that forms as a result of the fuel-oxygen reaction. The catalyst layer 314 is made up of a catalyst 314A dispersed on the surface of a support 314B. The electrolyte layer 320, shown presently in the form of a proton exchange membrane, is placed between each of the anode 310 and cathode 330 to allow the ionized hydrogen to flow from the anode 310 to the cathode 330 while inhibiting the passage of electrical current therethrough. Fuel (typically in the form of gaseous hydrogen) passes through flow channel 316, allowing the fuel to diffuse through electrode substrate 312 and come in contact with the catalyst 314A, through which the electrochemical oxidation of the hydrogen fuel proceeds by what is believed to be a dissociate adsorption reaction. This reaction is facilitated by catalyst 314A, typically in the form of finely-divided particles of a noble metal (such as platinum) that are dispersed over the surface of the support 314B, which is typically carbon-based. The positively-charged hydrogen ion (proton) produced at the anode 310 then passes through the electrolyte 320 to react with the negatively-charged oxygen ions generated at the cathode 330. The flow of liberated electrons sets up a current through the load 400 such that a motor or related current-responsive device may be turned. Load 400, shown in the form of the previously-discussed energy storage device, completes an electrical flowpath between the anode and cathode of fuel cell 300. An additional pump (not shown) can be included to remove from the electrode substrates 312, 332 water that would otherwise collect and possibly block the porous passageways.

Figure 2A:
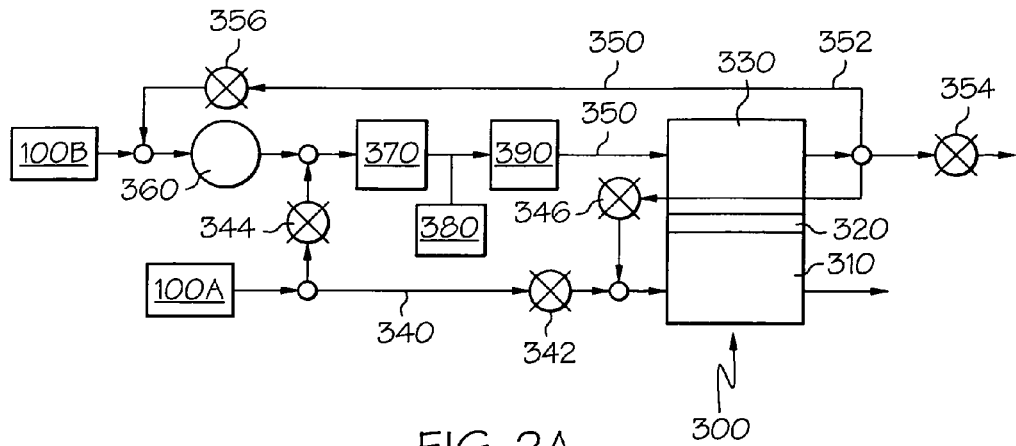
FIG. 2A shows a block diagram of a fuel cell system according to one aspect of the present invention.
Figure 2B:
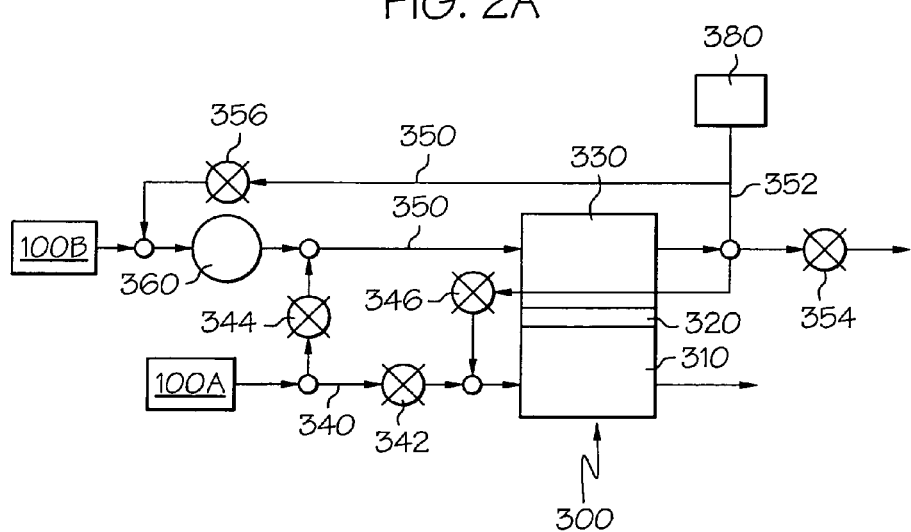
FIG. 2B shows a variation of the system of FIG. 2A.
Figure 2C:
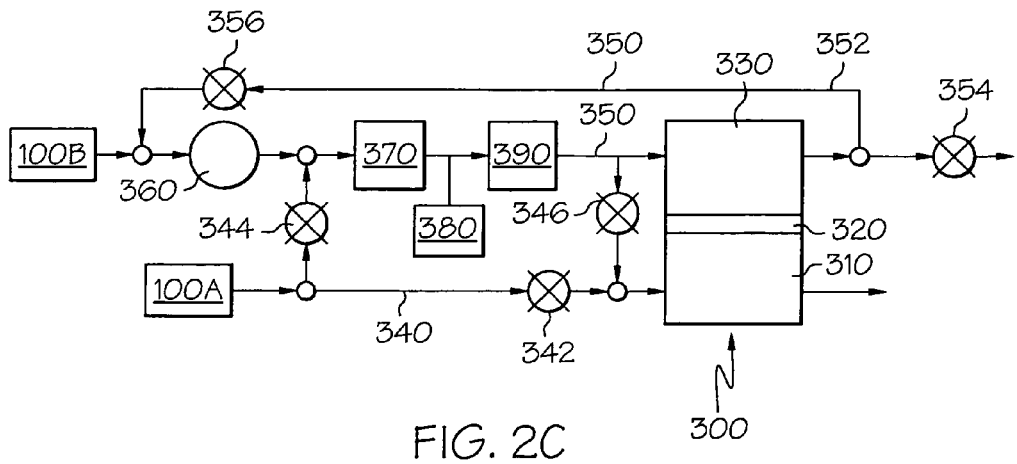
FIG. 2C shows a variation of the system of FIG. 2A, where the purge valve is disposed upstream of the cathode.

Referring next to FIGS. 2A, 2B and 2C, block diagrams of variations on the present system, both configured to reduce the hydrogen-oxygen interface in fuel cell 300, are shown. An anode flowpath 340 fluidly couples fuel source 100A to the anode 310 through a fuel supply valve 342. Oxygen source 100B is fluidly coupled to the cathode flowpath 350 such that oxygen can be flowed past cathode 330. As shown with particularity in all three figures, a recirculation loop 352 is placed in the cathode flowpath 350 to recycle a purge fluid (such as a nitrogen-rich gas) formed by the reaction of the hydrogen and oxygen. In addition to promoting the generation of the purge fluid through the consumption of oxygen, the recirculation loop 352 promotes uniformity of voltages between various cells. The recirculation loop 352 includes a pressure source 360, combustor 370, oxygen sensor 380 and cooler 390, all fluidly coupled to help pass various fluids repeatedly through the cathode 330 during operational transients so that specific species can be reduced through appropriate catalyzing or combustion reaction. Although only a single cooler 390 (which can be in the form of a heat exchanger) is depicted, it will be appreciated by those skilled in the art that additional coolers, as well as other locations for the cooler 390, may be used. By recycling the hydrogen, oxygen and generated purge fluid (collectively, the fluid being recirculated) several times through cooler 390, a smaller temperature rise is encountered, thus reducing thermal burdens on the system. A cathode exit valve 354 is disposed downstream of the cathode 330 to control the flow of fluid between the exhaust of cathode 330 and the recirculation loop 352, while a cathode flowpath recycle valve 356 allows selective introduction of the fluid being recirculated upstream of the cathode 330. Preferably, the pressure source 360 is an air compressor. The oxygen source 100B need not be shut off during operational transients (such as during startup or shutdown), as additional air tends to not flow into the recirculation loop 352 due to the presence of a dead head by virtue of the cathode exit valve 354 being closed. Fluid communication between the anode flowpath 340 and the cathode flowpath 350 is established though a fuel inerting valve 344 and a purge valve 346, which can be actuated independently or in tandem to achieve the desired fluid flow between the flowpaths 340, 350.

Another feature that can be incorporated into the present system is a combustor 370 (also known as a burner) placed in the recirculation loop 352 so that excess fuel can be burned. While the catalytic reaction between hydrogen and oxygen continues to occur at the cathode 330 as long as both reactants are present in the recirculation loop 352, the burning process enabled by combustor 370 can speed up the transient operation of the system by more quickly consuming the fuel, as well as reduce the likelihood of cathode overheating. To further speed up the reaction, a plurality of combustors can be used rather than a single combustor. Preferably, both the combustor 370 and the catalytic reaction at cathode 330 would be used to combine the best attributes of speed and completeness of hydrogen removal. In an additional feature, the combustor 370 could include catalytic elements disposed therein to further react the hydrogen with the oxygen in the air. In this case, the combustor elements (not shown) could be catalytically coated and electrically heated. In either configuration, the prompt and thorough removal of the reactable species is beneficial because it allows rapid starting and minimizes the aforementioned excess shutdown energy levels that would otherwise be generated as a result of the hydrogen-air interface formed on the anode. In such instances, without the system of the present invention, excessive voltage potentials can develop that will attack the support 314B.

Operational states of the fuel cell system 1 include at least a first operational state where the system is generating electricity, a second operational state where the system is not generating electricity, and a third operational state transiently between the first and second operational states. Such transient operation involves those periods of operation over which changes in system power output occur. Two times such operation is of particular concern to the present invention is during system startup and shutdown. As such, transient operation is distinguished over steady state operation, where the system output is substantially constant.

Referring with particularity to FIGS. 2A and 2B, the shutdown sequence of fuel cell system 1 preferably starts with closing fuel supply valve 342 to halt the flow of fuel to the anode 310. Next, the cathode exit valve 354 is closed while the cathode flowpath recycle valve 356 is opened to force the fluid exiting the cathode 330 into recirculation loop 352. In addition, the pressure source 360 (such as an air compressor) is operated to promote the fluid flow through the recirculation loop 352. The recirculation loop 352 is needed to move the fluid though the combustor 370 or cathode 330 so that the air and fuel are mixed and reacted on the appropriate catalyst. Fuel inerting valve 344 can be adjusted during the period of fluid recirculation to allow the introduction of hydrogen to the recirculating fluid, thereby reacting with any oxygen still present therein. The reduction in fuel cell voltage (which can be measured by conventional means) can be used as an indication that the cathode is inerted. Oxygen sensor 380 can be used to track the oxygen still present in the recirculation loop 352. The oxygen sensor 380 can be used to maintain a stoichiometric ratio between hydrogen and oxygen in situations where continued purging, discussed below, is necessary. As shown with particularity in FIG. 2A, the reaction can occur on a catalyst in combustor 370, after which excess heat generated in the fluid by the combustion process can be reduced prior to introduction into the cathode 330 by passing the fluid through a heat exchanger (in the form of a cooler 390). Such a cooler could be dual-use, in that it may also be used to cool the air exiting the air compressor. An alternate configuration, depicted in FIG. 2B, allows the reaction to take place on a catalyst on cathode 330. This variant would embody a simpler arrangement of components, possibly eliminating the need for separate combustor and associated cooling mechanism.

Depending on the speed of reaction required, one or both of the configurations in combination could be used. In either of the above configurations, once the oxygen in the recirculating fluid is consumed, purge valve 346 is opened to allow fluid communication between the anode flowpath 340 and cathode flowpath 350. This allows the (now substantially oxygen-free) fluid that hitherto this time had been entrained in the recirculation loop 352 to purge the anode 310 of residual fuel and other fluids. In cases where the fluid being used to provide oxygen to the cathode is air, it will be appreciated that once the oxygen is substantially removed, the remaining fluid will almost exclusively contain nitrogen with traces of other gases. Since the nitrogen is inert, its presence ensures a suitable benign fluid for purging the anode and cathode. In addition, the nitrogen itself can be easily purged as needed. Preferably, the purge fluid is withdrawn from exit of cathode 330 to take advantage of the entire volume of the cathode 330 for purging. While it is generally the case that the fluid capacity of the cathode within a fuel cell is greater than that of the anode, there could be circumstances where additional purge fluid is required for the anode. In such cases, the flow of fuel into the cathode loop 350 through fuel inerting valve 344 could be adjusted so that a substantially stoichiometric ratio between the fuel and oxygen in the cathode flowpath 350 can be maintained. A feedback-based controller (not shown) can be included, and based on signals transmitted by oxygen sensor 380, can be used to keep the desired fuel-to-oxygen ratio in the fluid passing through the recirculation loop 352. The measured fuel cell voltage can also be used to signal when the fuel to air ratio deviates from a preferred value, and could be used to adjust the ratio, keeping it within a desired range, as the fuel cell voltage would increase under conditions of excess air. Once the hydrogen has been purged from the anode 310, it may then be purged with air (or other fluids, if desired). In this situation, the fuel inerting valve 344 is closed, allowing fluid in the recirculation loop 352 that has been pressurized by pressure source 360 to flow into the anode 310 through purge valve 346. This last step ensures that air is present on both the anode 310 and cathode 330 during periods of inactivity of fuel cell 300.

The startup sequence of fuel cell system 1 would involve closing cathode exit valve 354 while opening the cathode flowpath recycle valve 356 to force the fluid exiting the cathode 330 into recirculation loop 352. As with the aforementioned shutdown sequence, the pressure source 360 is operated to promote the fluid flow through the recirculation loop 352. Fuel inerting valve 344 can be adjusted during the period of fluid recirculation to allow the introduction of hydrogen to the recirculating fluid, thereby reacting with any oxygen still present therein. As before, the reactions can take place in the devices of either of the embodiments shown in FIGS. 2A and 2B on a catalyst in combustor 370, on the cathode 330, or both. Purge valve 346 is opened to allow fluid communication between the anode flowpath 340 and cathode flowpath 350. This allows the (now substantially oxygen-free) fluid that hitherto this time had been entrained in the recirculation loop 352 to purge the anode 310 of residual air and other fluids. Preferably, the purge fluid is withdrawn from the exit of cathode 330 to take advantage of the entire volume of the cathode 330 for purging. Also as before, the flow of fuel into the cathode loop 350 through fuel inerting valve 344 could be adjusted so that a substantially stoichiometric ratio between the fuel and oxygen in the cathode flowpath 350 can be maintained. A feedback-based controller (not shown) can be included, and based on signals transmitted by oxygen sensor 380, can be used to keep the desired fuel-to-oxygen ratio in the fluid passing through the recirculation loop 352. Once the oxygen has been purged from the anode 310, the anode 310 may then be filled with hydrogen to begin normal operation. At this time (if not before), the fuel inerting valve 344 and the purge valve 346 would be closed, while the fuel supply valve 342 would be opened. During normal operation, the flow of fuel can be adjusted in a manner similar to that discussed above, including the use of a controller. Air can be bled into the anode 310 by opening the purge valve 346. Similarly, hydrogen can be bled into the cathode 330 by opening fuel inerting valve 344, thus providing additional heating to assist startup when the fuel cell 300 is exposed to low temperature environments.

Referring with particularity to FIG. 2C, the shutdown sequence of fuel cell system 1 differs slightly over that discussed in conjunction with FIGS. 2A and 2B above. While shutdown of all three configurations start with closing fuel supply valve 342 to halt the flow of fuel to the anode 310, followed by recirculation of the cathode flowpath gases by closing the cathode exit valve 354 while opening the cathode flowpath recycle valve 356, then consumption of excess oxygen in the recirculation loop 352, features unique to the configuration of FIG. 2C enable variations in the way the fuel cell 300 can be shut down. For example, the placement of the purge valve 346 upstream of the cathode 330 as shown in the figure allows (upon proper manipulation of the valves that interconnect the anode flowpath 340 and cathode flowpath 350) the introduction of air into the anode 310 as a purging fluid that need not pass through the cathode 330. This can be advantageous in that since the air is merely being pumped through compressor 360, and (unlike the inerting fluid generated by reaction of fuel and air in the combustor 370 or cathode 330) does not have to be reacted, operation is simplified, as fuel consumption otherwise necessary for the reacting goes down, and monitoring and feedback of controller 380 need not be undertaken. The rationale for such system operation is based on the belief that the reduction in fuel cell voltage as a result of inerting the cathode 330 (discussed in more detail below in conjunction with FIG. 4) allows the anode 310 to be purged with air without generating high electrode potentials that occur from normal open circuit voltage when the anode 310 is purged with air. It is understood that inerting of the cathode 330 includes allowing sufficient hydrogen into the cathode 330 to also react any oxygen that is adsorbed on the cathode 330 catalyst. Once the measured voltage between the plates of the anode 310 and cathode 330 falls below a predetermined level (such as 0.4 volts), no additional inerting would be required. Accordingly, it is the decreased reliance on inerting fluid generation and distribution that distinguishes the system shown in FIG. 2C from that of the other two. In this regard, the fuel inerting valve of FIG. 2C can be shut off once the fluid generated in the recirculation loop 352 reduces the measured voltage to the desired level, which generally coincides with the presence of a substantially oxygen-depleted inerting fluid. It will be appreciated that although the use of inerting fluid in the system of FIG. 2C is reduced, it is not done away with in its entirety, as it is still useful in reducing the open circuit voltage by displacing oxygen from the cathode 330 during the recirculation process in a manner similar to that of FIGS. 2A and 2B.

Similar to the shutdown sequence of fuel cell system 1 discussed in the foregoing paragraph, the startup sequence of the system of FIG. 2C allows the introduction of air purging without continued need for inerting fluid. There are similarities among the three depicted systems, where in all three configurations the fluid disposed in the cathode flowpath 350 is recycled through the recirculation loop 352, after which fuel is introduced into and reacted with the recycled fluid until the recycled fluid becomes substantially oxygen-depleted. Moreover, all three systems can exhibit a negative cell voltage as a result of fuel (hydrogen) presence in the cathode 330 simultaneous with oxygen resident in the anode 310 (left over, for example, because of the aforementioned shutdown step) at some time during the oxygen consumption taking place in the recirculation loop 352. As previously discussed, the placement of purge valve 346 upstream of cathode 330 facilitates ease of air purging, where after filling the anode 310 with fuel, normal operation of the system of FIG. 2C can commence by introducing air into the cathode 330 such that the fuel in anode 310 can cross membrane 320 and into cathode 330 to complete the reaction with the oxygen disposed therein.

Figure 3:
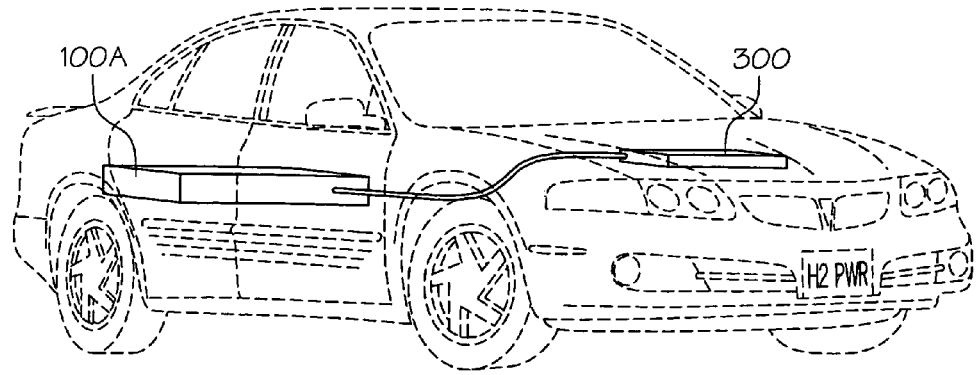
FIG. 3 shows a vehicle employing the fuel cell system of either FIG. 2A or FIG. 2B.

Referring next to FIG. 3 in conjunction with FIG. 1, a vehicle incorporating a fuel cell system according to the present invention is shown. Fuel cell 300 is fluidly coupled to a fuel supply 100A. While the vehicle is shown notionally as a car, it will be appreciated by those skilled in the art that the use of fuel cell systems in other vehicular forms is also within the scope of the present invention.

Figure 4:
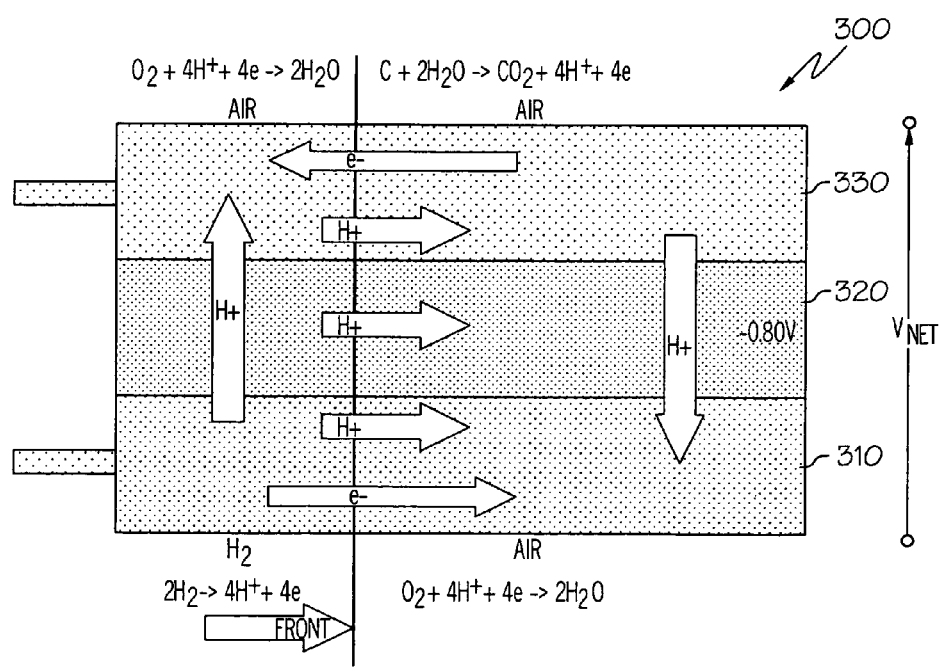
FIG. 4 shows the various electron and proton flowpaths and fluid regimes across a fuel cell during a fuel cell operational transient.

Referring next to FIG. 4, a representation of how voltage across the fuel cell varies during transient conditions, such as start-up and shutdown. As changes in the operating condition of fuel cell 300 occur, the makeup of the fluids in the anode 310 and cathode 330 change. For example, during steady-state operation, anode 310 has a relatively constant stream of fuel (typically in the form of hydrogen) flowing through it, while cathode 330 has a relatively constant stream of oxygen (typically in the form of air) flowing through it. Upon transient operation, such as going from steady-state to shutdown, the hydrogen already present in anode 310 continues to get consumed as the hydrogen is converted to protons and electrons. This hydrogen consumption creates a rarefied gas environment that gets filled by incoming air (coming from, for example, an open anode exhaust line), leading to the creation of a front (or hydrogen-air interface) that creates an electrode potential above the measured electrical voltage. The portion of the fuel cell 300 to the left of the front under normal open circuit voltage might show a measured electrical potential between the anode 310 and cathode 330 of approximately 0.9 volts, while the portion of the fuel cell 300 to the right of the front might experience an electrical potential of approximately 1.7 volts (including both the measured 0.9 volt open circuit voltage plus a reverse polarity negative electrochemical potential drop of 0.8 volts in the membrane 320 due to poor in-plane proton conduction to the region to the right of the front. Under these elevated potentials, the portion of the fuel cell 300 to the right of the front experiences a reduction in available hydrogen, and consequently resorts to oxidizing the carbon on the electrodes for its fuel source. By operating the system according to the present invention to produce a reduced measured voltage of 0.4 volts, the electrolyte to electrode potential difference could be reduced from approximately 1.7 volts to about 1.2 volts (i.e., the measured 0.4 volts of anode 310 to cathode 330 voltage and a −0.8V electrochemical potential drop).

Using the example voltages above, the open circuit voltage measured at various locations to the left of the front without employing the approach of the present invention would produce 0 volts at the anode 310, 0 volts at the membrane 320 and 0.9 volts at the cathode 330 (for a net voltage of 0.9 volts). The same on the right of the front would reveal 0 volts at the anode 310, −0.8 volts at the membrane 320 and 0.9 volts at the cathode 330 for a net voltage of 1.7 volts (which is enough to cause the aforementioned carbon oxidation). The open circuit voltage measured at various locations to the left of the front after employing the approach of the present invention would produce 0 volts at the anode 310, 0 volts at the membrane 320 and 0.4 volts at the cathode 330 (for a net voltage of 0.4 volts). Similarly, the same on the right of the front would reveal 0 volts at the anode 310, −0.8 volts at the membrane 320 and 0.4 volts at the cathode 330 for a net voltage of 1.2 volts (which would greatly reduce the amount of carbon oxidation relative to the previous approach).

While certain representative embodiments and details have been shown for purposes of illustrating the invention, it will be apparent to those skilled in the art that various changes may be made without departing from the scope of the invention, which is defined in the appended claims.

The invention claimed is:

1. A method of transiently operating a fuel cell system made up of at least one fuel cell comprising an anode, a cathode, a membrane disposed between said anode and cathode, an anode flowpath fluidly coupled between said anode and a fuel source, a cathode flowpath fluidly coupled between said cathode and an oxygen source and including a recirculation loop with means for selectively introducing fuel therein, a combustor for selectively reacting said selectively introduced fuel with oxygen in said recirculation loop, and an anode purge flowpath selectively fluidly coupled between said anode flowpath and said cathode flowpath such that voltage potentials on fuel cell components are reduced, said method comprising:
   selecting from one of two transient operating modes, said first mode comprising starting up said system, and said second mode comprising shutting down said system;
   recycling fluid disposed in said cathode flowpath through said recirculation loop;
   creating a purging fluid by reacting fuel introduced through said selective fuel introducing means with oxygen in said combustor;
   discontinuing said reacting through disabling at least one of said combustor and said selective fuel introducing means once a voltage measured across said fuel cell reaches a predetermined level that is commensurate with a substantial consumption of said oxygen in said recirculation loop; and
   introducing said purging fluid from said recirculation loop into at least one of said anode or said cathode such that any fluid previously resident therein is substantially purged therefrom.

2. The method according to claim 1, wherein said anode purge flowpath comprises a purge valve disposed therein to effect said selective introduction of said purging fluid into said anode purge flowpath from said recirculation loop.

3. The method according to claim 1, wherein said selecting comprises selecting said first mode of operation.

4. The method according to claim 3, further comprising filling said anode with fuel after said reacting has been discontinued.

5. The method according to claim 4, further comprising flowing air through said cathode once said anode has been filled with fuel.

6. The method according to claim 5, wherein said flowing air through said cathode comprises disabling said recirculation loop.

7. The method according to claim 1, wherein said selecting comprises selecting said second mode of operation.

8. The method according to claim 7, wherein said introducing a fluid into at least one of said anode or said cathode comprises sequentially introducing into said anode a substantially oxygen-depleted fluid from at least a portion of said cathode flowpath followed by air from said oxygen source.

9. The method according to claim 8, further comprising decoupling said anode from said fuel source prior to recycling fluid disposed in said cathode flowpath through said recirculation loop.

10. The method according to claim 9, further comprising stopping fluid flow through said cathode flowpath once said anode is substantially purged.

11. The method according to claim 7, wherein said introducing a fluid into at least one of said anode or said cathode comprises introducing air into said anode.

12. The method according to claim 11, wherein said air is from said oxygen source.

* * * * *